(12) United States Patent
Soanes-Brown (10) Patent No.: US 10,328,601 B2
(45) Date of Patent: Jun. 25, 2019

(54) MITRE CUTTING GUIDE TOOL

(71) Applicant: HICI Limited, Walesby, Newark, Nottinghamshire (GB)

(72) Inventor: Daniel Soanes-Brown, Newark (GB)

( * ) Notice: Subject to any disclaimer, the term of this patent is extended or adjusted under 35 U.S.C. 154(b) by 129 days.

(21) Appl. No.: 15/547,841

(22) PCT Filed: Feb. 4, 2016

(86) PCT No.: PCT/GB2016/000024
§ 371 (c)(1),
(2) Date: Aug. 1, 2017

(87) PCT Pub. No.: WO2016/124883
PCT Pub. Date: Aug. 11, 2016

(65) Prior Publication Data
US 2018/0015634 A1    Jan. 18, 2018

(30) Foreign Application Priority Data
Feb. 6, 2015 (GB) .................................. 1502024.1

(51) Int. Cl.
| | | |
|---|---|---|
| B27G 13/00 | (2006.01) | |
| B27G 5/02 | (2006.01) | |
| G01B 3/56 | (2006.01) | |
| G01B 7/30 | (2006.01) | |

(52) U.S. Cl.
CPC .............. B27G 5/026 (2013.01); B27G 5/02 (2013.01); G01B 3/56 (2013.01); G01B 7/30 (2013.01)

(58) Field of Classification Search
CPC ...................................................... B27G 11/28
USPC ........................................................... 33/415
See application file for complete search history.

(56) References Cited

U.S. PATENT DOCUMENTS

| | | | | |
|---|---|---|---|---|
| 760,892 | A * | 5/1904 | Marrs ...................... | B27G 5/02 83/766 |
| 2,526,852 | A * | 10/1950 | Colton ..................... | G01B 3/56 33/455 |
| 5,713,135 | A * | 2/1998 | Acopulos ................. | G01B 3/56 33/1 PT |
| 5,845,410 | A * | 12/1998 | Boker ...................... | B27B 25/10 33/536 |
| 7,406,774 | B2 * | 8/2008 | Shapiro ................... | G01B 3/563 33/471 |
| 2003/0230180 | A1 * | 12/2003 | Hines ...................... | B23D 51/025 83/162 |

(Continued)

*Primary Examiner* — George B Bennett
(74) *Attorney, Agent, or Firm* — Bernhard P. Molldrem, Jr.

(57) ABSTRACT

A mitre cutting guide tool (1) comprises a first body section (2*a*) having a substantially planar outer face with an outer edge configured to rest against the face of a skirting board or coving to guide a cutting tool in use; a second body section (2*b*) rotationally connected to the first body section (2*a*) via a connecting means (5); a sensing means (9) configured to measure the angle between the first and second body sections (2*a*, 2*b*); a locking means (5) configured to connect the first and second body sections (2*a*, 2*b*) so that the angle can be altered and to lock the first and second body sections (2*a*, 2*b*) in position to set a given angle; the second body section (2*b*) supporting the first body section (2*a*) at the set angle against the length of skirting board or coving; the connecting means and/or locking means (5) configured so that the space between the first and second body sections (2*a*, 2*b*) is substantially unobstructed.

20 Claims, 4 Drawing Sheets

(56) References Cited

U.S. PATENT DOCUMENTS

| | | | |
|---|---|---|---|
| 2009/0038168 A1* | 2/2009 | Wixey | B43L 7/10 33/471 |
| 2012/0311880 A1* | 12/2012 | Doggett | B43L 7/14 33/452 |
| 2015/0101206 A1* | 4/2015 | Smith | G01B 3/563 33/534 |

* cited by examiner

MITRE CUTTING GUIDE TOOL

FIELD

The present invention relates to a mitre cutting guide tool. More particularly, the present invention relates to a combination measuring and calculating mitre cutting guide tool. Even more particularly, the present invention relates to a combination measuring and calculating mitre cutting guide tool for cutting coving, cornice, crown moulding, skirting board or baseboard to form mitre joints.

BACKGROUND

Figure 1:
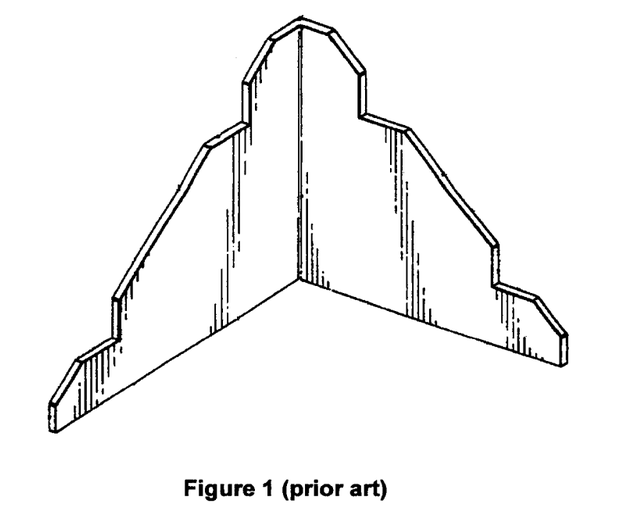
FIG. 1 shows a perspective view of a Coving Cornice Mitre Template such as is known in the prior art, the tool formed with two sides substantially perpendicular to one another, so that when the outer ends are positioned on a length of coving, the faces will be aligned at an angle of 45 degrees to the main longitudinal axis of the coving, the tool having tabs that extend from the outer corners to in use rest against the edge of a length of coving and hold the tool in position on the coving, the tool formed as a unitary item by plastic injection moulding, or stamping and forming from a metal sheet.

Coving (also known as cornice and crown moulding) and skirting board (also known as baseboard) are lengths of material formed and positioned to extend along a wall either between the wall and ceiling (coving), or the bottom of a wall and the floor (skirting board). The purpose is for the coving or skirting board to act as a decorative material to conceal or dress the corner joint between the wall/ceiling or wall/floor. Where two walls meet, the ends of the coving or skirting board are cut at an angle (a mitre cut) to mutually abut—for example, if two vertical walls meet at 90 degrees, then the ends of the coving/skirting board running along each wall will be mitre cut at 45 degrees to form two substantially identical end faces at an angle of 45 degrees to the main face of the skirting board, the end faces extending from or into the corner to abut one another. These angled or mitre cuts are generally considered to provide a more aesthetically pleasing finish than having an end face of one length of skirting board abut the side of the neighbouring length at its end. If a 45 degree cut is required, there are a number of tools that can be used, such as for example the Coving Cornice Mitre Template tool shown in FIG. 1. This is a non-adjustable tool formed as a unitary item by plastic injection moulding, or stamping and forming from a metal sheet. The two sides are substantially perpendicular to one another so that when the outer ends are positioned on a length of coving, the faces of each side will be aligned at an angle of 45 degrees to the main longitudinal axis of the coving.

One problem that is frequently encountered when fitting coving or skirting board is that wall corners are often not precisely 90 degree right angles. This is frequently the case with older buildings, or in buildings where the walls were squared by hand. In addition, many buildings contain features where two adjacent walls are intentionally formed so as not to meet at right-angles—for example if a room has a feature such as a bay window.

There are a number of methods and tools currently in use for measuring the corner angle so as to correctly mitre cut coving or skirting board, so that the ends of adjacent lengths will meet cleanly.

One common method involves using a sliding bevel gauge and a set of complex calculations, the results of which are transferred to a compound mitre saw to cut the coving or skirting board. Alternatively, a tool such as the Bosch GAM angle finder (or a similar angle finder) can be used to measure the corner and again transfer the required cut measurements to a separate tool for cutting. Both of these methods are complex, lengthy, and (if using a power saw) noisy and messy, especially for coving mitres.

U.S. Pat. No. 4,608,899 describes and shows a tool for guiding mitre cuts, where the angle between the two faces can be adjusted. However, the tool described can only be used for internal corners due to the placement of the hinge and locking mechanism, which prevents the tool from pressing flush against an external corner. Furthermore, when the angle of the cut is not for a 90 degree corner, the angle of the mitre and angle of the bevel change so that two separate measurements need to be calculated and marked in order to make the cut. The tool does not calculate the angles required, nor does it display the angle that it is adjusted to.

For measuring and cutting skirting board mitres where different angles may be required, the current practice is to use a sliding bevel gauge and then bisect triangles on the rear face of the skirting board in order to determine the angle of the mitre, or alternatively to use a digital protractor, calculate the required cut and transfer the measurement to a compound mitre saw.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a mitre cutting guide tool the helps to overcome the disadvantages outlined above, or which at least provides the public with a useful choice.

The term "comprising" as used in this specification and indicative independent claims means "consisting at least in part of", and is intended as an inclusive rather than exclusive term. When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a mitre cutting guide tool, comprising: a first body section comprising a substantially planar outer face having an outer edge configured to rest against the face of a length of skirting board or coving, the planar outer face configured to guide a cutting tool onto and through the length of skirting board or coving; a second body section, rotationally connected to the first body section via a connecting means; a sensing means configured to measure the angle between the first and second body sections, and; a locking means configured to connect the first and second body sections so that the angle can be altered and the first and second body sections can be locked in position to set a given angle; the second body section further configured to support the first body section at the set angle against the face of a length of skirting board or coving; the connecting means and/or locking means configured so that the space between the first and second body sections is substantially unobstructed. A tool having this configuration simplifies and combines the process for both measuring wall angles and for calculating the angle at which lengths of material such as skirting board or coving should be cut in order to achieve the correct angle for fitment, and allows all the measuring and calculating operations to be carried out using a single tool, the tool also acting as a cutting tool guide.

In an embodiment, the connecting means is configured to allow the first and second body sections to rotate substantially through a full rotation relative to one another. This helps to ensure that a user can use the tool in the widest variety of scenarios.

In an embodiment, the locking means comprises a cam lever. This is a simple, inexpensive, reliable, easy-to-use and readily available mechanism.

In an embodiment, the cam lever forms at least part of the connecting means. This helps to simplify the construction of the tool.

In an embodiment, the sensing means is a magnetic sensor. This is a simple, inexpensive, reliable and readily available type of sensor.

In an embodiment, the mitre cutting guide tool further comprises an integral display configured to display angles up to 359.9 degrees, the display receiving data from the sensing means and displaying the angle between the first and second body sections. This assists a user with the measurement process.

In an embodiment, the mitre cutting guide tool further comprises a control panel configured for user activation to zero the tool. This assists a user with the measurement process.

In an embodiment, at least the first body section comprises a substantially rectangular main planar portion. This has been found to be a suitable form for use with lengths of skirting board.

In an embodiment, the first and second body sections comprise substantially planar sections aligned substantially parallel to the axis of rotation between the two body sections. This provides a simple and reliable form of tool.

In an embodiment, the first and second body sections each further comprise a wall portion extending inwards from the top edge substantially perpendicularly to the planar sections. This assists with aligning the tool against a wall in use.

In an embodiment, the mitre cutting guide tool further comprises at least one rotatable tag connected to the upper surface of one of the wall portions, the other of the wall portions further comprising at least one cut-out section positioned to correspond to the at least one tag so that the tag can slot into the cut-out section in use. This assists with keeping the tool aligned with and in contact with the edge of a length of material to be measured and cut.

In an embodiment, the planar sections further comprise cut out folds formed in the in the planar portions aligned in the same direction as the wall portions, and having inner edges aligned with the inner edges of the wall sections. This helps to keep the planar outer face aligned with a wall in use.

In an embodiment, the first body section further comprises at least one magnet. This assists with holding a saw or other cutting tool against the planar outer face.

In an embodiment, the mitre cutting guide tool further comprises an arm configured to hold a cutting tool against the planar outer face of the first body section. This assists with holding a saw or other cutting tool against the planar outer face.

In an embodiment, the arm is spring-loaded. This further assists with holding a saw or other cutting tool against the planar outer face.

In an embodiment, at least the first body section is substantially rectangular. This form is most suitable for use with lengths of skirting board.

In an embodiment, at least the first body section has the form of a scalar triangle. This has been found to be the best form for use with lengths of coving.

In an embodiment, the shortest side; of the triangle is aligned in parallel with the axis of rotation formed by the rotational connection. This assists with ensuring that the tool will easily locate onto a length of coving.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which:

FIG. 2 shows a perspective view of a first embodiment of the tool of the present invention, used for creating mitre cuts on lengths of material such as skirting board, the tool having two substantially similar planar rectangular body portions hingedly connected to one another via opposite corners on one of the edges so that an axis of rotation parallel to the connection edges is formed, each of the body sections having wall portions that extend perpendicularly to the planar portion along the upper and lower sides of the body portion, perpendicular to the axis of rotation, the two body sections connected at one end/side via a cam lever and at the other end via a hinge, a sensor located midway between the cam lever and hinge, a combination display and control panel located on one of the body sections, the display configured to show angles up to 359.9 degrees, the tool shown open, with the two body sections rotated away from one another.

FIG. 4 shows a perspective view of a second embodiment of the tool of the present invention, used for creating mitre cuts on lengths of coving, the tool having two substantially similar planar scalar triangle body portions hingedly connected to one another via opposite corners on one of the edges so that an axis of rotation parallel to the connection edges is formed in parallel with the shortest sides of the triangular body portions, each of the body sections having wall portions that extend perpendicularly to the planar portion along the upper edges of the body portion, perpendicular to the axis of rotation, the two body sections connected at one end/side via a cam lever and at the other end via a hinge, a sensor located midway between the cam lever and the hinge, a combination display and control panel located on one of the body sections, the display configured to show angles up to 359.9 degrees, the tool shown in use, located on a length of coving.

DETAILED DESCRIPTION

Embodiments of the present invention will now be described with reference to the figures.

Figure 2:
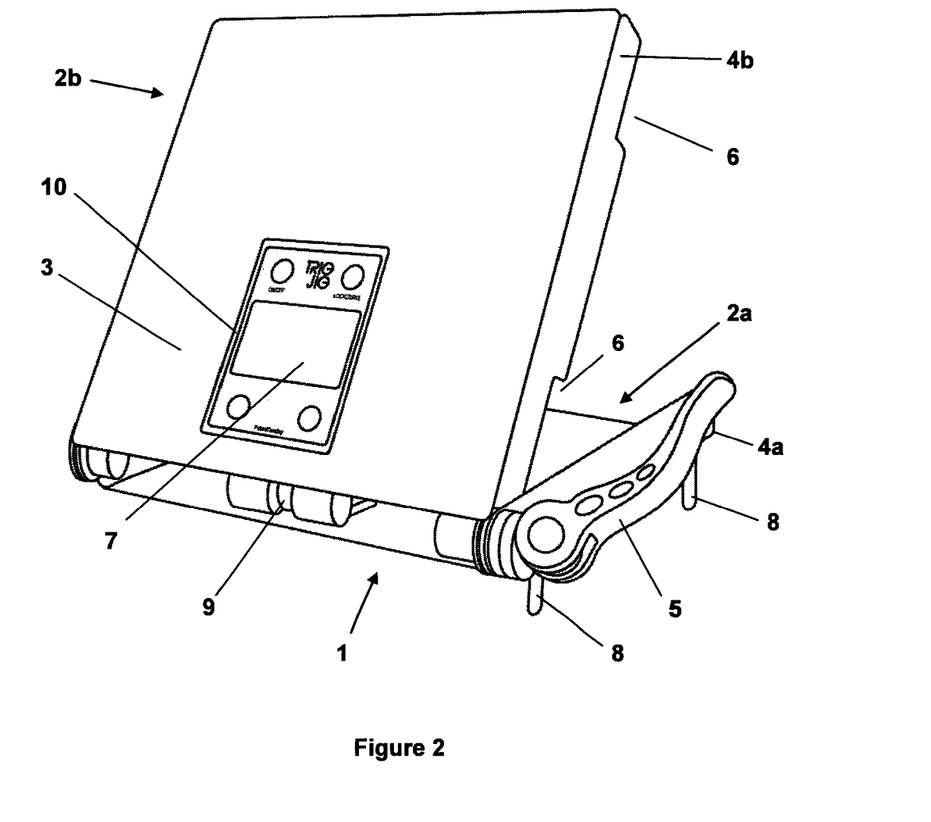

A first embodiment of mitre cutting guide tool 1 is shown in FIG. 2. In this embodiment, the tool 1 is used for creating mitre cuts on lengths of material with a substantially flat face—e.g. skirting board, which generally has a flat outer face that when fitted extends in parallel to the (vertical) wall when fitted.

Figure 3:
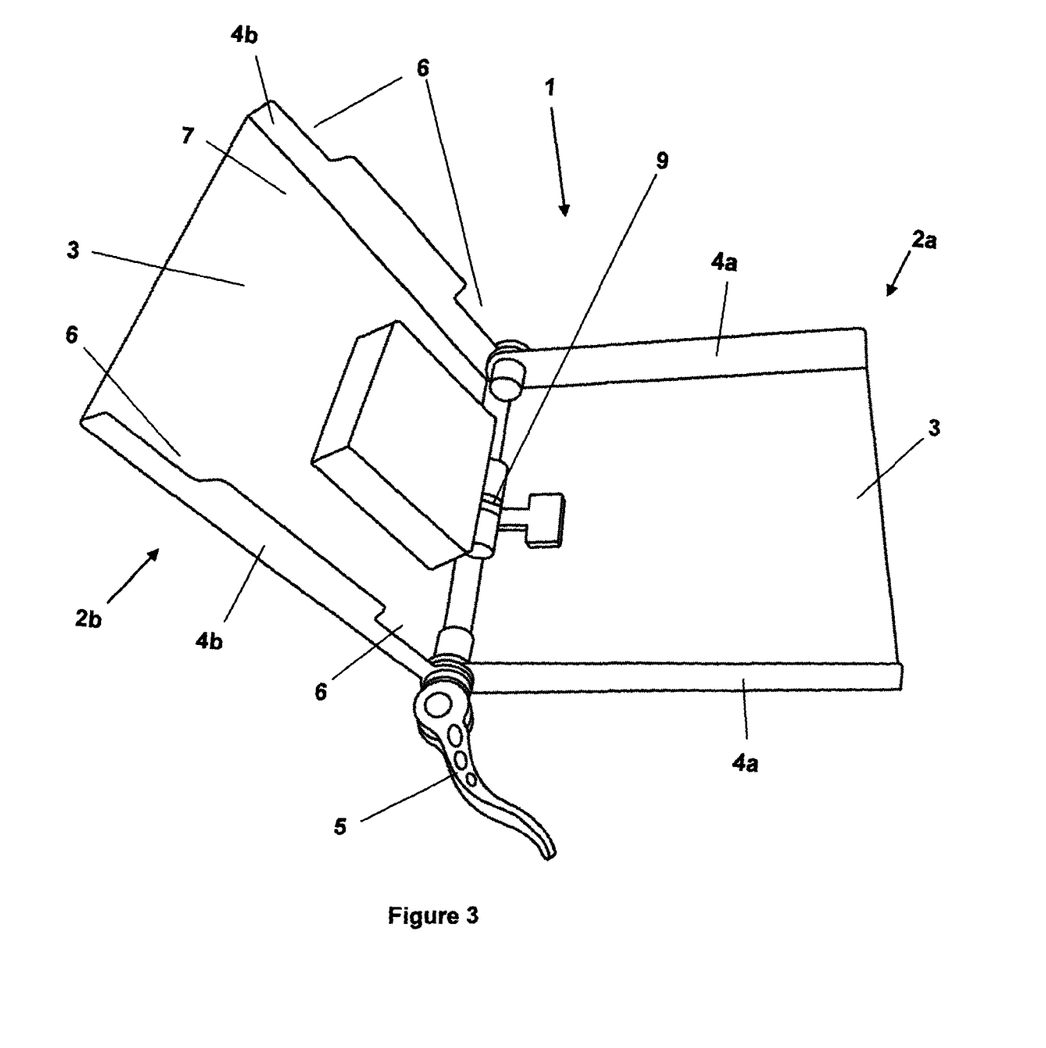
FIG. 3 shows a perspective view of the first embodiment of the tool of the present invention of FIG. 1 from the opposite side.

The tool 1 comprises two substantially similar body portions or body sections 2. Each of the body sections has a main planar portion 3 that is generally rectangular in shape. As shown in FIGS. 2 and 3, the body sections 2 are connected to one another via opposite corners on one of the long edges. The connection is a hinge connection so that an axis of rotation is formed along or close to the connected long sides of the rectangular body sections 2, the body sections 2 rotating relative to one another about the axis, the planar portions 3 of the body sections 2 aligned substantially parallel to the axis of rotation. Each of the body sections 2 have wall portions 4 that extend perpendicularly to the planar portion 3 along the shorter sides of the body portion 2, perpendicular to the axis of rotation. The body sections 2 are formed so that they can be rotated to a 'closed' position, with the wall portions 4 formed so that an inner one will just fit inside the other (outer one) in this position, so that the wall portions 4 overlap. That is, the two body sections 2 comprise an inner body section 2a and an outer body section 2b, the wall portion 4a of the inner body section 2a fitting inside the wall portion 4b of the outer body section 2b.

The two body sections 2a, 2b are connected at one end/side via a cam lever 5, which forms the hinge connection at one end. When the cam lever is in an unlocked position, the two body sections can freely rotate around the axis of rotation. In a locked position, the cam lever 5 holds the two body sections 2a, 2b in position relative to one another—i.e. locks them in position to maintain the angle between them. The hinge connection at the other or opposite end/side is via any suitable connection mechanism, such as a rivet, a nut/bolt fastener or similar. The cam lever 5 is narrower in width or aspect than the height of the wall portion 4, so that it won't overlap the wall section 4 and interfere with its operation.

A sensor 9 is located at approximately the midpoint between the cam lever 5 and the hinge at the opposite end. The sensor 9 is configured to measure the angle between the two body sections 2a, 2b. The sensor 9 is a magnetic measuring sensor.

A pair of tags 8 are connected to the inner body section 2a on one of the shorter sides of the inner body section 2a, on the wall portion 4a. Each of the tags 8 is formed from a short length of stiff material, such as metal or plastic. Each tag 8 has rounded ends. The tags 8 are connected to the wall portion 4a at or close to one end of the tag, in such a manner that they can freely rotate in a plane parallel with that of the wall sections, and so that a portion of the body of the tag can rotate between an outer position where the body of the tag 8 partly overlaps the edge of the wall portion 4a, and an inner position where the tag 8 is fully within the perimeters or edges of the wall portion 4a.

A pair of cut-out sections 6 are located in the wall portion 4b on the outer body section 2b on a shorter side of the body section 2b. The cut-out sections are opposite the tags 8. That is, the position of the cut-out sections 6 corresponds to the tags 8, so that the tags 8 can slot into the cut-out sections 6 when the body sections 2a, 2b are in the 'closed' position.

The two tags 8 can freely rotate so that they do not obstruct the tool 1 when the tool 1 is positioned in an external corner. The tags 8 are swivelled outwards when the tool 1 is placed on skirting to ensure the edge of the tool 1 lines up with or correctly aligns with the edge of the skirting board—that is, they are used to hook over the edge of the skirting board to line the edge of the tool 1 up with the edge of the skirting board.

A PCB (not shown) is also included as part of the tool 1. The PCB receives the reading from the sensor 9, and controls the output of a display 7, located on a face of one of the body sections 2. The display is a digital LCD display with two rows that displays angles to one decimal place. In practical everyday use, the tool will not be used past 180 degrees (both arms fully open). An external corner beyond 180 degrees becomes an internal corner and can be measured as such. The display is at least capable of displaying angles up to 180 degrees to one decimal place. The sensor 9 sends the data to a microprocessor that calculates the required angle on one line, as well as displaying a live feed to the other line of the screen to show the live angle between the two body sections 2a, 2b (this feed runs via the microprocessor too). The display 7 is recessed to avoid saw damage.

A control panel 10 is co-located with the display 7. The control panel 10 comprises a number of buttons which when pressed can reset the display, zero the tool and other operations as will be described in detail below.

In operation, the tool 1 is first zeroed. The tool 1 is closed by bringing the body sections 2a, 2b together, with the inner body section 2a inside the outer body section 2b. In this position (fully closed), the angle between the two should read as zero on the display 7. A user can zero the tool 1 by pressing a zero button on the control panel 10. The tool 1 is then opened for use. For use with internal obtuse angles under 180 degrees the cutting faces are placed against the wall to carry out the necessary measurements. Once the angle is over 181 degrees it effectively becomes an external reflex angle, and the inside faces of the tool 1 are located against the walls to carry out the measurements.

The tool 1 is held in position until a measurement of the angle between the walls has been completed by the sensor 9, with this angle displayed on the display 7. A further alert can be added such as a beep or similar to alert a user to completion of the operation. The PCB hardware/software calculates the angle required to make the desired mitre cut, and this is also displayed on the display screen 7. The user then adjusts the tool 1 so that the actual angle of the tool 1 matches the displayed calculated angle, by rotating the body sections 2a, 2b relative to one another. The second line of the display indicates the angle as the user adjusts the position of the body sections 2a, 2b, and a user will match this to the measured angle displayed on the upper line of the display. A user will then use the cam lever 5 lock the body sections 2a, 2b in position. A user will then place the tool on the length of skirting board to be cut, with the outer face of the body portion 2a resting on and parallel to the plane of one of the larger lengthways faces of the skirting board. The outer face of body portion 2b will extend at an angle to this face, with the user ensuring that this faces in the direction desired to make the required cut. The tool 1 is squared up to the edge of the skirting using the tags 8, which are rotated to protrude from the outer face of body section 2a in order to ensure the cut is straight. A user then places their cutting device against the cutting face (the outer face of body portion 2b) and uses this as a guide in order to make the required cut. For example, if using a wood saw, the flat body of the saw will be placed against the outer face of body section 2a, which will be used as a guide to guide the saw as the cut is made.

In this embodiment, magnets (not shown) are embedded in the faces of the body sections 2a, 2b. These help to ensure that the body of a saw or other similar cutting device is held against the face. A user can operate the saw by sliding this backwards and forwards in the plane of the face, with the magnets creating little to no impediment to the back-and-forth sawing action. However, the magnets will hold the saw against the face and ensure that the saw remains in, and cuts in, parallel to the face. The magnets prevent the saw from coming away from the cutting guide face during the cutting motion.

In alternative embodiments, an alternative retaining means, such as a spring loaded or flexible arm can be used instead of (or in tandem with) the magnets. This can be useful in situations where the sensor used is too sensitive for magnets to be used.

The body sections 2a, 2b of the tool 1 can be made from laser cut sheet metal, bent into shape post-cutting. The tool 1 could also be made of plastic.

Figure 4:
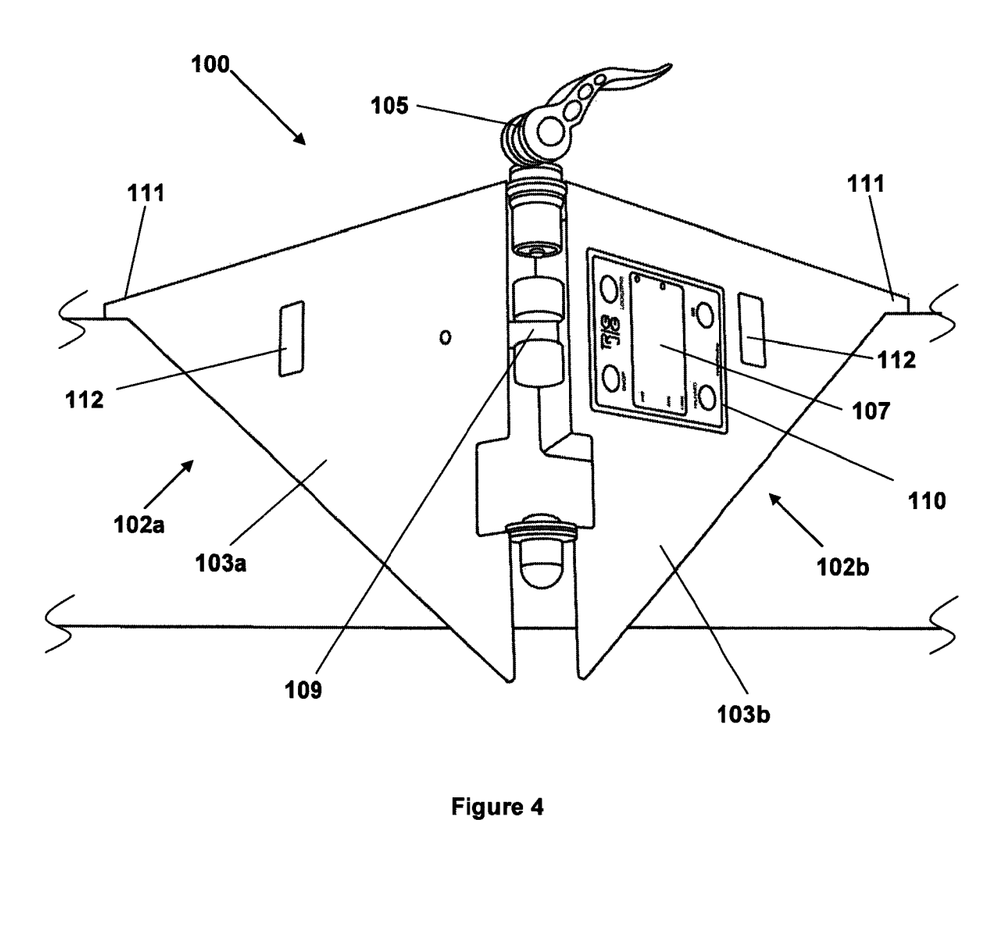
Figure 5:
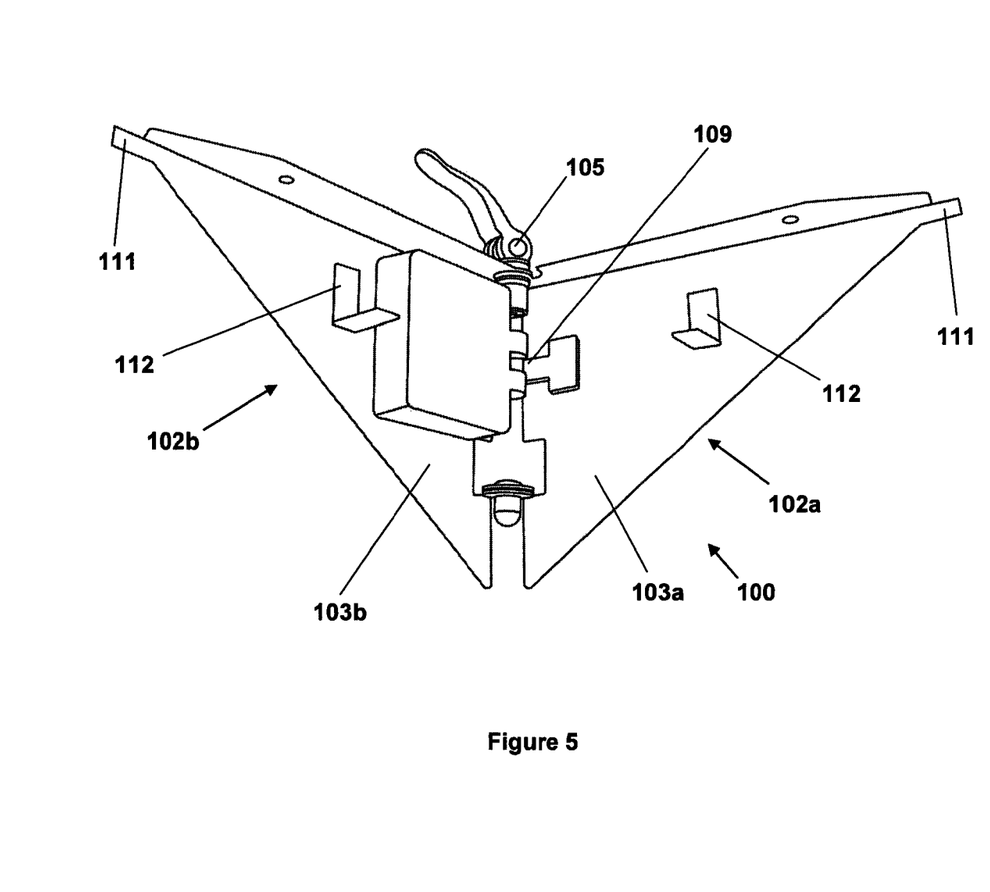
FIG. 5 shows the tool of FIG. 4 shows a perspective view of the second embodiment of the tool of the present invention of FIG. 4 from the opposite side.

A second embodiment of tool 100 suitable for mitre cutting coving will now be described, with reference to FIGS. 4 and 5.

The tool 100 in this embodiment has the same general form as that described above for the first embodiment. However, in this embodiment, each of the body sections 102a, 102b has the form of a scalene triangle, each of the body sections 102a, 102b the same size and shape as the other. The two body sections 102a, 102b are connected to one another via opposite corners on the shortest edges. As outlined above for the first embodiment, the connection is a hinge connection so that an axis of rotation is formed along or close to the connected short sides of the body sections 102a, 102b with the body sections 102a, 102b rotating relative to one another about the axis, the planar portions 103a, 103b of the body sections 102a, 102b aligned substantially parallel to the axis of rotation.

In this embodiment, each of the body sections 102 has a wall portion 104 that extends along the top edge only. The body sections 102 are formed so that they can be rotated to a 'closed' position, with the wall portions 104 formed so that one on one side will just fit inside the other in this position, so that the wall portions 104 overlap. That is, the two body sections 102a, 102b comprise an inner body section 102a and an outer body section 102b, the wall portion 104a of the inner body section 102a fitting inside the wall portion 104b of the outer body section 102b.

In this embodiment, cut out folds 112 are formed in the in the planar portions 103a, 103b. These are cut out sections where three sides of a rectangle are cut in the planar portion, and the cut out section folded inwards (i.e. in the same direction as the wall portions 104). The cuts are sized so that when the cut out folds 112 are folded inwards, they have the same height as the wall sections. This ensures that the tool 100 fits square against the wall for when measuring external (reflex) angles. The cut outs are necessary to make room for the hinges, and to keep the tool straight. If these are not present, the result can be a skewed fit.

A pair of end tabs 111 are located at the corner where the longest side or edge meets the middle side/edge. These hook onto the upper edge of the coving when the tool is placed on the coving to hold the tool 100 in position. In the preferred embodiment, these are formed by extending the wall sections 104 slightly beyond the front corner.

The tool 100 of the second embodiment further has a cam lever 105, which forms the hinge connection at one end, and which locks and unlocks to hold the two body sections 102a, 102b in position relative to one another, or to allow them to freely rotate around the axis of rotation. In a locked position, the cam lever 5 another—i.e. locks them in position to maintain the angle between them. The cam lever 105 is narrower in width or aspect than the height of the wall portion 104, so that it won't overlap the wall section 104 and interfere with it's operation.

The tool 100 of the second embodiment also has the following elements, substantially similar to the first embodiment described above: a sensor 109 configured to measure the angle between the two body sections 102a, 102b, a pair of tags 108 on the wall section 104a on the longest side, each of the tags 108 substantially similar to the tags 8 described above, and connected and operating in a similar fashion, and a pair of cut-out sections 106 located in the wall portion 104b opposite (the position of the cut-out sections 106 corresponding to the tags 108, so that the tags 108 can slot into the cut-out sections 106 when the body sections 102a, 102b are in the 'closed' position). The tool 100 of the second embodiment also has a display 107 located on a face of one of the body sections 102, the display operating in a similar fashion to that described above, and a control panel 110 co-located with the display 107, configured to operate in a similar manner to that described above.

In operation, the tool 100 is zeroed in a similar fashion to that described above for the tool 1. The angle between the two walls is measured using the tool 100 in a similar fashion to that described above. The tool 100 is then locked into position and placed along the face of a length of coving as shown in FIG. 4. The two end tabs 111 at the outer extremity of the tool 100 hold it in place. A mark is made on both the wall edge and ceiling edge of the length of coving where the edge of the planar body section on one side of the tool 100 rests against the coving. This mark can be made for example with a pencil or similar.

The tool 100 is then readjusted to the bevel angle by a user opening and closing the tool 100 until the angle at which the tool is open matches the previously calculated bevel angle. The tool 100 is locked and the side where the cutting tool (e.g. saw) will be used is lined up against the previously made earlier marks on the wall and ceiling edge. The pitch (bevel) of the tool will have changed—e.g. it will be steeper (the body parts 102a, 102b will be closer together). This means that the tool 100 will sit differently on the coving to how it sat in the previous step, and it won't be possible to use the end tabs 111 to 'hook' the tool 100 into position. The body part that is aligned with the previously created marks is used as a cutting guide arm. The other, opposite body part is used to support the cutting guide arm at the required bevel angle. The cut can then be made by using a saw or cutter along the surface of the outer face of the cutting guide arm. In a similar manner to that outlined above for the first embodiment, magnets can be fitted to help keep the saw flush against the cutting guide face.

This process is then repeated on the opposite side to make both sides of the mitre joint. To cut the other side of the mitre the tool is then adjusted back to the angle of the cut, lines drawn and readjusted to the bevel angle and the cut made.

For coving, it may be necessary for some cuts to extend the angle of the tool beyond a particular limit. For these wider cuts, the angle of the tool will be halved, and a line drawn on the coving perpendicular to the length of coving. The tabs 111 are used to hold the tool 100 flat against one edge of coving so a right angle line can be drawn using the tool 100. The side used for marking the angle will still be used in that way, but the other side will be lined up along this perpendicular line first, then the two lines on the coving (wall and ceiling) can be marked as normal, and the bevel angle used as normal. This ensures that the tool can be adjusted in how it sits to make sure the every angle can be measured and cut.

The invention claimed is:

1. A mitre cutting guide tool, comprising:
    a first body section comprising a substantially planar outer face having an outer edge configured to rest against the face of a length of skirting board or coving, the planar outer face configured to guide a cutting tool onto and through the length of skirting board or coving;
    a second body section, rotationally connected to the first body section via a connecting means;
    a sensing means configured to measure the angle between the first and second body sections;
    a locking means configured to connect the first and second body sections so that the angle can be altered and the first and second body sections can be locked in position to set a given angle;
    the second body section further configured to support the first body section at the set angle against the face of a length of skirting board or coving;
    the connecting means and/or locking means configured so that the space between the first and second body sections is substantially unobstructed.

2. A mitre cutting guide tool as claimed in claim 1 wherein the connecting means is configured to allow the first and second body sections to rotate substantially through a full rotation relative to one another.

3. A mitre cutting guide tool as claimed in claim 1 wherein the locking means comprises a cam lever.

4. A mitre guide tool as claimed in claim 3 wherein the cam lever forms at least part of the connecting means.

5. A mitre cutting guide tool as claimed in claim 1 wherein the sensing means is a magnetic sensor.

6. A mitre cutting guide tool as claimed in claim 1 further comprising an integral display configured to display angles up to 359 degrees, the display receiving data from the sensing means and displaying the angle between the first and second body sections.

7. A mitre cutting guide tool as claimed in claim 1 further comprising a control panel configured for user activation to zero the tool.

8. A mitre cutting guide tool as claimed in claim 1 wherein a least the first body section comprises a substantially rectangular main planar portion.

9. A mitre cutting guide tool as claimed in claim 1 wherein the first and second body sections comprise substantially planar sections aligned substantially parallel to the axis of rotation between the two bodies.

10. A mitre cutting guide tool as claimed in claim 9 wherein the first and second body sections each further comprise a wall portion extending inwards from the top edge substantially perpendicular to the planar sections.

11. A mitre cutting guide tool as claimed in claim 10 further comprising at least one rotatable tag connected to the upper surface of one of the wall portions, the other of the wall portions further comprising at least one cut-out section positioned to correspond to the at least one tag so that the tag can slot into the cut-out section in use.

12. A mitre cutting guide tool as claimed in claim 9 wherein the planar sections further comprise cut out folds formed in the planar portions aligned in the same direction as the wall portions, and having inner edges aligned with the inner edges of the wall sections.

13. A mitre cutting guide tool as claimed in claim 1 wherein the first body section further comprises at least one magnet.

14. A mitre cutting guide tool as claimed in claim 1 further comprising an arm configured to hold a cutting tool against the planar outer face of the first body section.

15. A mitre cutting guide tool as claimed in claim 14 wherein the arm is spring-loaded.

16. A mitre cutting guide tool as claimed in claim 1 wherein at least the first body section is substantially rectangular.

17. A mitre cutting guide tool as claimed in claim 1 wherein at least the first body section has the form of a scalar triangle.

18. A mitre cutting guide tool as claimed in claim 17 wherein the shortest side of the triangle is aligned in parallel with the axis of rotation formed by the rotational connection.

19. A mitre cutting guide tool as claimed in claim 10 wherein the planar sections further comprise cut out folds formed in the planar portions aligned in the same direction as the wall portions, and having inner edges aligned with the inner edges of the wall sections.

20. A mitre cutting guide tool as claimed in claim 11 wherein the planar sections further comprise cut out folds formed in the planar portions aligned in the same direction as the wall portions, and having inner edges aligned with the inner edges of the wall sections.

* * * * *